US010597545B2

(12) United States Patent
Lewis et al.

(10) Patent No.: US 10,597,545 B2
(45) Date of Patent: Mar. 24, 2020

(54) FOAM INK COMPOSITION AND 3D PRINTED HIERARCHICAL POROUS STRUCTURE

(71) Applicant: President and Fellows of Harvard College, Cambridge, MA (US)

(72) Inventors: Jennifer A. Lewis, Cambridge, MA (US); Joseph T. Muth, Somerville, MA (US)

(73) Assignee: President and Fellows of Harvard College, Cambridge, MA (US)

(*) Notice: Subject to any disclaimer, the term of this patent is extended or adjusted under 35 U.S.C. 154(b) by 203 days.

(21) Appl. No.: 15/574,716

(22) PCT Filed: May 16, 2016

(86) PCT No.: PCT/US2016/032651
§ 371 (c)(1),
(2) Date: Nov. 16, 2017

(87) PCT Pub. No.: WO2016/187097
PCT Pub. Date: Nov. 24, 2016

(65) Prior Publication Data
US 2018/0142108 A1 May 24, 2018

Related U.S. Application Data (60) Provisional application No. 62/162,998, filed on May 18, 2015.

(51) Int. Cl.
C09D 11/03 (2014.01)
C09D 11/52 (2014.01)
(Continued)

(52) U.S. Cl.
CPC .............. *C09D 11/03* (2013.01); *B28B 1/001* (2013.01); *B29C 64/106* (2017.08);
(Continued)

(58) Field of Classification Search
None
See application file for complete search history.

(56) References Cited

U.S. PATENT DOCUMENTS 7,053,125 B2   5/2006   Lewis et al.
7,141,617 B2   11/2006  Gratson et al.
(Continued)

FOREIGN PATENT DOCUMENTS

WO   WO 2013/096664 A1   6/2013
WO   WO 2014/182535 A1   11/2014
(Continued)

OTHER PUBLICATIONS

International Search Report and Written Opinion for International PCT Application No. PCT/US2016/032651, dated Aug. 19, 2016, pp. 1-10.
(Continued)

*Primary Examiner* — Mary Lynn F Theisen
(74) *Attorney, Agent, or Firm* — Brinks Gilson & Lione (57) ABSTRACT

A foam ink composition for printing porous structures comprises stabilizing particles and gas bubbles dispersed in a solvent. The stabilizing particles comprise a predetermined interfacial energy so as to exhibit a contact angle with the solvent of from about 15° to about 90°. At least a portion of the stabilizing particles are positioned at interfacial regions between the solvent and the gas bubbles, thereby stabilizing the gas bubbles in the foam ink composition. A 3D printed hierarchical porous structure comprises one or more continuous filaments arranged in a predetermined pattern on a substrate, the one or more continuous filaments comprising a sintered material and including a porosity of at least about 40 vol. %.

7 Claims, 9 Drawing Sheets (51) Int. Cl.
*B33Y 70/00* (2020.01)
*B29C 64/106* (2017.01)
*B28B 1/00* (2006.01)
*C04B 38/10* (2006.01)
*B29C 64/245* (2017.01)
*B29C 64/209* (2017.01)
*C08J 9/00* (2006.01)
*C08J 9/12* (2006.01)
*C04B 103/48* (2006.01)
*C04B 111/00* (2006.01)
*B29K 105/04* (2006.01)

(52) U.S. Cl.
CPC .......... *B29C 64/209* (2017.08); *B29C 64/245* (2017.08); *B33Y 70/00* (2014.12); *C04B 38/10* (2013.01); *C08J 9/008* (2013.01); *C08J 9/0023* (2013.01); *C08J 9/12* (2013.01); *C09D 11/52* (2013.01); *B29K 2105/04* (2013.01); *C04B 2103/48* (2013.01); *C04B 2111/00181* (2013.01)

(56) References Cited

U.S. PATENT DOCUMENTS

| | | | |
|---|---|---|---|
| 7,790,061 | B2 | 9/2010 | Gratson et al. |
| 7,799,251 | B2 | 9/2010 | Therriault et al. |
| 7,922,939 | B2 | 4/2011 | Lewis et al. |
| 7,956,102 | B2 | 6/2011 | Lewis et al. |
| 8,101,139 | B2 | 1/2012 | Therriault et al. |
| 8,187,500 | B2 | 5/2012 | Lewis et al. |
| 8,310,134 | B2 | 11/2012 | Ajayan et al. |
| 2009/0325780 | A1* | 12/2009 | Gauckler ............... A61L 27/105 501/84 |
| 2010/0171394 | A1 | 7/2010 | Glenn et al. |
| 2010/0298720 | A1 | 11/2010 | Potkay |
| 2010/0330220 | A1 | 12/2010 | Gratson et al. |
| 2013/0084449 | A1 | 4/2013 | Lewis et al. |
| 2014/0314954 | A1 | 10/2014 | Lewis et al. |
| 2015/0137665 | A1 | 5/2015 | Imran |
| 2016/0317095 | A1 | 11/2016 | Berger et al. |

FOREIGN PATENT DOCUMENTS

| | | |
|---|---|---|
| WO | WO 2014/209994 A2 | 12/2014 |
| WO | WO 2015/069619 A1 | 5/2015 |
| WO | WO 2015/073944 A2 | 5/2015 |
| WO | WO 2015/120429 A1 | 8/2015 |
| WO | WO 2015/120430 A1 | 8/2015 |

OTHER PUBLICATIONS

Ahn, Bok Yeop et al., "Printed Origami Structures," *Adv. Mater.*, 22, 20 (2010) pp. 2251-2254.
Ahn, Bok Y. et al., "Omnidirectional Printing of Flexible, Stretchable, and Spanning Silver Microelectrodes," *Science*, 323 (2009) pp. 1590-1593.
Ashby, M. F. et al., "Designing hybrid materials," *Acta Materialia*, 51 (2003) pp. 5801-5821.
Aveyard, Robert et al., "Emulsions stabilised solely by colloidal particles," *Adv. Colloid Interface Sci.*, 100-102 (2003) pp. 503-546.
Banhart, John, "Manufacturing Routes for Metallic Foams," *JOM*, 52, 12 (2000) pp. 22-27.
Bauer, Jens et al., "High-strength cellular ceramic composites with 3D microarchitecture," *Proc. Natl. Acad. Sci.*, 111, 7 (2014) pp. 2453-2458.
Binks, Bernard P., "Particles as surfactants—similarities and differences," *Curr. Opin. Colloid Interface Sci.*, 7, 1 (2002) pp. 21-41.
Bouville, Florian et al., "Lightweight and stiff cellular ceramic structures by ice templating," *J. Mater. Res.*, 29, 2 (2014) pp. 175-181.

Chabi, Sakineh et al., "Ideal Three-Dimensional Electrode Structures for Eelectrochemical Energy Storage," *Adv. Mater.*, 26, 15 (2014) pp. 2440-2445.
Chuanuwatanakul, Chayuda et al., "Producing Large Complex-Shaped Ceramic Particle Stabilized Foams," *J. Am. Ceram. Soc.*, 96, 5 (2013) pp. 1407-1413.
Compton, Brett G. et al., "3D-Printing of Lightweight Cellular Composites," *Advanced Materials*, 26 (2014) pp. 5930-5935.
Conrad, Jacinta C. et al., "Structure of Colloidal Gels during Microchannel Flow," *Langmuir*, 24, 15 (2008) pp. 7628-7634.
Dawson, Matthew A. et al., "Optimization of cylindrical shells with compliant cores," *International Journal of Solids and Structures*, 44 (2007) pp. 1145-1160.
Deville, Sylvain, "Freeze-Casting of Porous Ceramics: A Review of Current Achievements and Issues," *Advanced Engineering Materials*, 10, 3 (2008) pp. 155-169.
Dittmann, Jens et al., "Micro Structural Investigations and Mechanical Properties of Macro Porous Ceramic Materials from Capillary Suspensions," *J. Am. Ceram. Soc.*, 97, 12 (2014) pp. 3787-3792.
Eckel, Zak C. et al., "Additive manufacturing of polymer-derived ceramics," *Science*, 351, 6268 (2016) pp. 58-62.
Finkle, Philip et al., "The Theory of Emulsification," *J. Am. Chem. Soc.*, 45, 12 (1923) pp. 2780-2788.
Fleck, N.A. et al., "Micro-architectured materials: past, present and future," *Proc. R. Soc. A*, 466 (2010) pp. 2495-2516.
Fratzl, Peter et al., "Nature's hierarchical materials," *Progress in Materials Science*, 52 (2007) pp. 1263-1334.
Gibson L. J. et al., "The Structure and Mechanics of Cork," *Proc. R. Soc. Lond. A*, 377, 1769 (1981) pp. 99-117.
Gibson, L. J. et al., "The Mechanical Properties of Natural Materials. II. Microstructures for Mechanical Efficiency," *Proc. R. Soc. Lond. A*, 450 (1995) pp. 141-162.
Gibson, L.J. et al., "Cellular Materials in Nature and Medicine," Cambridge Univ. Press, Cambridge, UK).
Gibson, Lorna J., "Biomechanics of cellular solids," *Journal of Biomechanics*, 38 (2005) pp. 377-399.
Gibson, Lorna J., "The hierarchical structure and mechanics of plant materials," *J. R. Soc. Interface*, 9, 76 (2012) pp. 2749-2766.
Gonzenbach, Urs T. et al., "Processing of Particle-Stabilized Wet Foams Into Porous Ceramics," *J. Am. Ceram. Soc.*, 90, 11 (2007) pp. 3407-3414.
Gonzenbach, Urs T. et al., "Ultrastable Particle-Stabilized Foams," *Angew. Chem. Lnt. Ed.*, 45, 21 (2006) pp. 3526-3530.
Gonzenbach, Urs T., "Macroporous Ceramics from Particle-Stabilized Wet Foams," *J. Am. Ceram. Soc.*, 90, 1 (2007) pp. 16-22.
Gonzenbach, Urs T., "Particle-Stabilized Foams and Their Potential Applications," Nonmetallic Inorganic Materials, Department of Materials, ETH Zurich Symposium, Sep. 5, 2008.
Gratson, Gregory M. et al., "Direct Writing of Three-Dimensional Webs," *Nature*, 428 (2004) p. 386.
Hollister, Scott J., "Porous scaffold design for tissue engineering," *Nat. Mater.*, 4, 7 (2005) pp. 518-524.
Karam, G.N. et al., "Biomimicking of animal quills and plant stems: natural cylindrical shells with foam cores," *Materials Science and Engineering C2* (1994) pp. 113-132.
Klotz, Michaela et al., "Ice Templating—An Alternative Technology to Produce Micromonoliths," *Advanced Engineering Materials*, 14, 12 (2012) pp. 1123-1127.
Lewis, Jennifer A, "Colloidal Processing of Ceramics," *Journal of the American Ceramic Society*, 83, 10 (2000) pp. 2341-2359.
Lewis, Jennifer A "Direct Ink Writing of 3D Functional Materials," *Adv. Funct. Mater.*, 16 (2006) pp. 2193-2204.
Meyers, Marc André et al., "Structural Biological Materials: Critical Mechanics—Materials Connections," *Science*, 339, 6121 (2013) pp. 773-779.
Meza, Lucas R. et al., "Resilient 3D hierarchical architected metamaterials," *Proc. Natl. Acad. Sci.*, 112, 37 (2015) pp. 11502-11507.
Meza, Lucas R. et al., "Strong, lightweight, and recoverable three-dimensional ceramic nanolattices," *Science*, 345, 6202 (2014) pp. 1322-1326.
Minas, Clara et al., "3D Printing of Emulsions and Foams into Hierarchical Porous Ceramics," *Adv. Mater.*, 28 (2016) pp. 9993-9999.

(56) References Cited

OTHER PUBLICATIONS

Munch, Etienne et al., "Architectural Control of Freeze-Cast Ceramics Through Additives and Templating," *J. Am. Ceram. Soc.*, 92, 7 (2009) pp. 1534-1539.
Ostos, J. Bernal et al., "Deformation stabilization of lattice structures via foam addition," *Acta Materialia*, 60 (2012) pp. 6476-6485.
Parlett, Christopher M. A. et al., "Hierarchical porous materials: catalytic applications," *Chem. Soc. Rev.*, 42, 9 (2013) pp. 3876-3893.
Pickering, Spencer Umfreville, "CXCVI.—Emulsions," *J. Chem. Soc., Trans.*, 91, 23 (1907) pp. 2001-2021.
Prum, Richard O. et al., "Coherent light scattering by blue feather barbs," *Nature*, 396 (1998) pp. 28-29.
Schaedler, T. A. et al., Ultralight Metallic Microlattices, *Science*, 334, 6058 (2011) pp. 962-965.
Schulman, J. H. et al., "Control of Contact Angles at the Oil-Water-Solid Interfaces, Emulsions Stabilized by Solid Particles ($BaSO_4$)," *Trans. Faraday Soc.*, 50 (1954) pp. 598-605.
Smay, James E. et al., "Colloidal Inks for Directed Assembly of 3-D Periodic Structures," *Langmuir*, 18, 14 (2002) pp. 5429-5437.
Stocco, Antonio et al., "Aqueous foams stabilized solely by particles," Soft Matter, Royal Society of Chemistry, 7, 4 (2011) pp. 1260-1267.
Studart, André R. et al., "Processing Routes to Macroporous Ceramics: A Review," *J. Am. Ceram. Soc.*, 89, 6 (2006) pp. 1771-1789.
Tallon, Carolina et al., "Mechanical strength and damage tolerance of highly porous alumina ceramics produced from sintered particle stabilized foams," *Ceramics International*, 42 (2016) pp. 8478-8487.
Tao, Peng et al., "Bioinspired Engineering of Thermal Materials," *Adv. Mater.*, 27, 3 (2015) pp. 428-463.
Therriault, Daniel et al., "Rheological Behavior of Fugitive Organic Inks for Direct-Write Assembly," *Applied Rheology*, 17, 1 (2007) pp. 10112-1-10112-8.
Wegst, Ulrike G. K. et al., "Bioinspired structural materials," *Nature Materials*, 14 (2015) pp. 23-36.
Weinkamer, Richard et al., "Solving conflicting functional requirements by hierarchical structuring—Examples from biological materials," *MRS Bulletin*, 41, 9 (2016) pp. 667-671.
Wu, Willie, et al., "Omnidirectional Printing of 3D Microvascular Networks," *Advanced Materials*, 23, 24 (2011) pp. H178-H183.
Zheng, Xiaoyu et al., "Multiscale metallic metamaterials," *Nature Materials*, 15, 10 (2016) pp. 1100-1106.
Zheng, Xiaoyu et al., "Ultralight, Ultrastiff Mechanical Metamaterials," *Science*, 344, 6190 (2014) pp. 1373-1377.

\* cited by examiner

FIG. 1A  FIG. 1B  FIG. 1C

Length Scale of Hierarchy

FOAM INK COMPOSITION AND 3D PRINTED HIERARCHICAL POROUS STRUCTURE

RELATED APPLICATION

The present patent document is the national stage of International Application No. PCT/US2016/032651, which was filed on May 16, 2016, and which claims the benefit of priority under 35 U.S.C. § 119(e) to U.S. Provisional Patent Application No. 62/162,998, which was filed on May 18, 2015, and is hereby incorporated by reference in its entirety.

FEDERALLY SPONSORED RESEARCH OR DEVELOPMENT

This invention was made with government support under contract number DMR-1305284 awarded by the National Science Foundation. The government has certain rights in the invention.

TECHNICAL FIELD

The present disclosure is related generally to three-dimensional (3D) printing and more particularly to the 3D printing of hierarchical porous materials.

BACKGROUND

Current manufacturing methods are unable to produce structures with hierarchical material control on multiple length scales. If materials with highly architected structures could be created, then multifunctional materials and devices with superior properties could be fabricated. Existing techniques for creating and patterning foams tend to produce unstable structures with relatively low porosity, and are incapable of producing arbitrary shapes in three dimensions. With further advancements in foam processing, higher performing materials and improved devices, such as filters, catalyst supports and structural members, may be attainable.

BRIEF SUMMARY

A foam ink composition for printing porous structures comprises stabilizing particles and gas bubbles dispersed in a solvent, where the stabilizing particles comprise a predetermined interfacial energy so as to exhibit a contact angle with the solvent of from about 15° to about 90°. At least a portion of the stabilizing particles are positioned at interfacial regions between the solvent and the gas bubbles, thereby stabilizing the gas bubbles in the foam ink composition.

A 3D printed hierarchical porous structure comprises one or more continuous filaments arranged in a predetermined pattern on a substrate. The one or more continuous filaments comprise a sintered material and including a porosity of at least about 40 vol. %.

BRIEF DESCRIPTION OF THE DRAWINGS

FIGS. 5A-5E show 3D printed hierarchical porous structures arranged in various 3D patterns, including grid or logpile (5A-5B) and cellular (5C-5E) patterns, where

DETAILED DESCRIPTION

A foam ink composition that can be readily patterned in three-dimensions by 3D printing is described herein. Lattices, grids, cellular structures, spanning structures, and various other hierarchical porous structures may be created, each containing macroscale porosity from the 3D printed pattern which may be referred to as "printed porosity" as well as intrinsic microscale porosity from the foam ink composition itself.

Figure 1A:
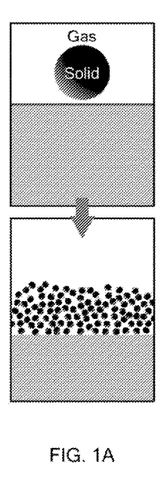
FIGS. 1A-1C are schematics illustrating how contact angle (θ) affects the stability of a particle in a solvent.
Figure 1B:
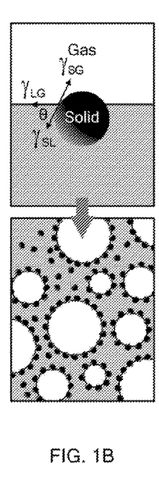
Figure 1C:
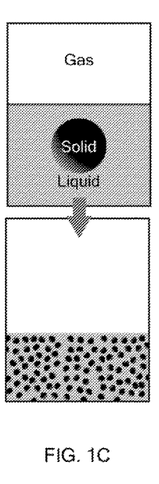

The foam ink composition comprises stabilizing particles and gas bubbles dispersed in a solvent. The stabilizing particles comprise a predetermined interfacial energy so as to exhibit a contact angle (θ) with the solvent of from about 15° to about 90°. At least a portion of the stabilizing particles are positioned at interfacial regions between the solvent and the gas bubbles, thereby stabilizing the gas bubbles in the ink composition, as illustrated in FIG. 1B. In some cases, the contact angle of the stabilizing particles with the solvent may lie in the range of from about 20° to about 75°. The foam ink composition may be referred to as a particle-stabilized foam ink.

The foam ink composition may include an aqueous or organic solvent. Typically, water is used, and other examples are given below. To facilitate 3D printing, which entails extrusion through a nozzle, the foam ink composition may be viscoelastic with a shear-dependent viscosity.

The stabilizing particles may comprise any of a number of inorganic or organic materials that can be prepared having a suitable interfacial energy, including metals, ceramics, semiconductors or polymers. Typically, the stabilizing particles comprise a metal, an oxide, a carbide, a hydride or a polymer. For example, suitable stabilizing particles may comprise aluminum oxide (alumina), as described in the examples below, other oxides, such as titania, silica, zirconia and/or ceria, or carbides such as silicon carbide.

The stabilizing particles may include a surface modifier on surfaces thereof for the purpose of controlling the interfacial energy of the particles. The surface modifier (or surfactant) may comprise a short chain amine, a short chain fatty acid, or a short chain sulfonate. The former may be preferred for negatively charged particles, while the latter two may be advantageous for positively charged particles. Suitable short chain amines may include methyl amino propylamine (MAPA), dimethyl amino propylamine (DAPA), n-propyl amine, or others. Suitable short chain fatty acids may be selected from butyric acid, valeric acid, propionic acid, and enanthic acid. Example sulfonates include sodium salts of 1-butanesulfonate, 1-pentanesulfonate, or 1-heptanesulfonate.

The surface modifier may be present in an amount that depends on the surface area of the stabilizing particles and the length of the hydrophobic portion of the surface modifier. Typically, the surface modifier is included in an amount of at least about 0.1 µmol/m² of the stabilizing particle surface area, and the amount may also be at least about 0.5 µmol/m², at least about 1 µmol/m², or at least about 3 µmol/m² of the stabilizing particle surface area. Typically, the amount is no greater than 20 µmol/m², 15 µmol/m², or 12 µmol/m² of the stabilizing particle surface area. For example, the amount of the surface modifier may range from about 0.1 µmol/m² to about 10 µmol/m² of the stabilizing particle surface area. The stabilizing particle surface area may be determined using Brunauer-Emmett-Teller (BET) measurements, as known in the art.

In some cases, such as when the stabilizing particles comprise one or more polymers, a surface modifier may not be needed to tune the interfacial energy of the particles. In this case, the hydrophilicity/hydrophobicity may be modified by mixing solvents with different surface energies to form a mixed solvent that has an optimized interfacial energy with the stabilizing particles. For example, for some polymers, such as polyvinylidene difluoride (PVDF), a suitable mixed solvent may include ethanol and water. Other examples of suitable solvents, which may optionally be mixed with water, include ethanol, acetone, isopropanol, dimethylsulfoxide, and n-methyl-2-pyrrolidone. These solvents may be employed with polymeric and/or other types of stabilizing particles (e.g., metal, ceramic, semiconducting), as set forth above.

The stabilizing particles typically have an average particle size in the range of from about 1 nm to about 10 microns, where "average particle size" refers to an average linear dimension of the particles (e.g., an average diameter in the case of substantially spherical particles, or an average length or width in the case of non-spherical particles). The preferred size of the stabilizing particles may be determined by the desired size of the gas bubbles. As would be recognized by one of ordinary skill in the art, the average particle size may be some fraction of the average diameter of the gas bubbles. For example, the stabilizing particles may have an average particle size that is no more than 50%, no more than 20%, no more than 10%, or no more than 1% of the average diameter of the gas bubbles. The average particle size may be about 1 micron or less, about 500 nm or less, or about 100 nm or less. Generally, the stabilizing particles are at least about 10 nm, at least about 20 nm, at least about 100 nm, at least about 300 nm, or at least about 500 nm in average particle size.

The stabilizing particles may be present in the foam ink composition at a concentration of from about 20 vol. % to about 50 vol. %. The portion of the stabilizing particles that are positioned at the interfacial regions between the solvent and the gas bubbles is some fraction greater than 0% and less than 100%. For example, at least about 5%, at least about 10%, at least about 20%, or at least about 30% of the stabilizing particles may be positioned at the interfacial regions. In some cases, less than about 90%, less than about 80%, less than 70%, or less than 60% of the stabilizing particles may be positioned at the interfacial regions.

Typically, the gas bubbles are present in the foam ink composition at a concentration of from about 40 vol. % to about 80 vol. %. The average diameter of the gas bubbles is typically from about 1 micron to about 50 microns, or from about 2 microns to about 20 microns. The gas bubbles may be air bubbles, or they may comprise another gas, such as an inert gas (e.g., $N_2$, Ar, or He). The gas bubbles may be introduced into the foam ink composition by frothing, either mechanically or chemically (e.g., with a blowing agent such as a peroxide) in air or a controlled environment.

In addition to the stabilizing particles, gas bubbles and solvent, the foam ink composition may further include a drying retarder such as a starch, glycerol or cellulose to prevent premature drying of the ink during printing. The foam ink composition may also or alternatively comprise a non-gelled polymer precursor or a binder, either of which may be used as a green body strength enhancer after the ink is printed, as described below.

Other components of the foam ink composition may include different types of stabilizing particles, nonabsorbing particles, and/or fugitive particles, all of which are described further below.

To prepare the foam ink composition, the stabilizing particles, along with any of the optional components mentioned above and/or elsewhere in this disclosure, are dispersed in the solvent to form a precursor mixture. Air is incorporated into the precursor mixture using frothing methods known in the art to produce bubbles. For example, an automated rotating impeller may be employed for frothing at a suitable rotation speed, such as from 100 to 10,000 rpm, or more typically from 1,000 to 2,000 rpm. A foam ink composition is obtained when bubbles have been incorporated into the precursor mixture at the desired concentration and level of homogeneity. The frothing conditions may be controlled to obtain bubbles of a desired size.

Figure 2:
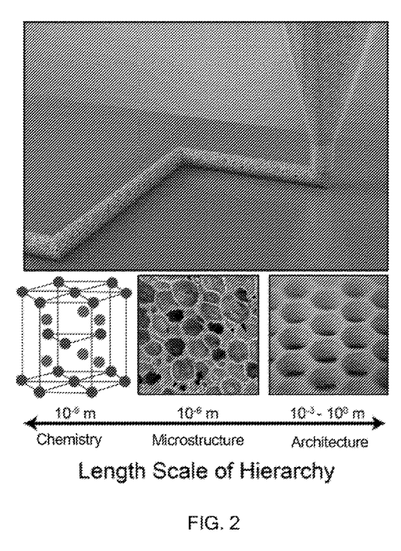
FIG. 2 illustrates 3D printing of a foam ink composition (top), with the bottom figures illustrating the hierarchy of porosity in the 3D printed porous structure.
Figure 5A:
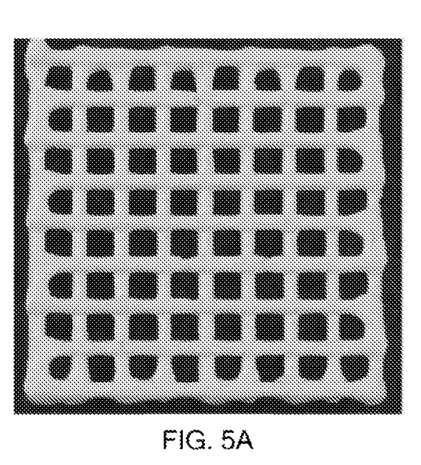
Figure 5B:
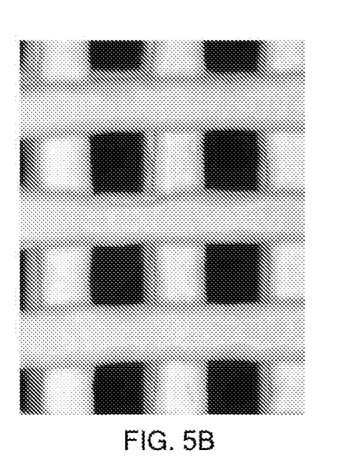
Figure 5C:
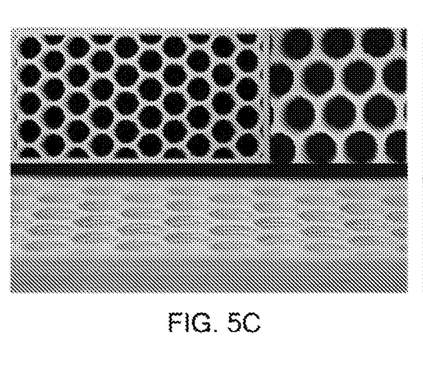
Figure 5D:
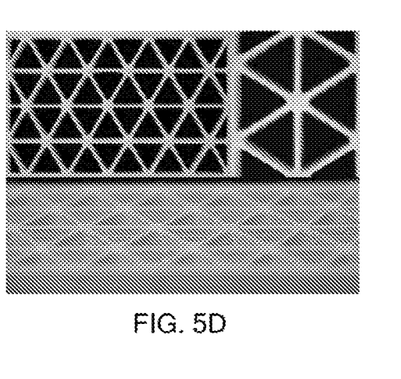

Also set forth herein is a method of printing a hierarchical porous structure that comprises extruding the foam ink composition as described above (and/or elsewhere in this disclosure) through a deposition nozzle and depositing a continuous filament comprising the foam ink composition on a substrate, as shown for example in FIG. 2. One or more of the continuous filaments may be deposited on the substrate in a predetermined pattern, such as a lattice or grid structure, as shown in FIGS. 5A and 5B, or a cellular structure comprising cell walls separating empty cells, as shown in FIGS. 5C and 5D. After deposition, drying and sintering of the continuous filament, as described below, the particle-stabilized foam ink composition becomes a sintered porous structure that may include both (a) macroscale or printed porosity defined by the predetermined pattern of the one or more continuous filaments as well as (b) microscale porosity determined by the microstructure of the continuous filament(s) and/or the foam ink composition.

Returning to FIG. 2, the depositing of the continuous filament on the substrate may be carried out in a controlled environment saturated with a vapor of the solvent. For example, when water is used as the solvent or as a constituent of a mixed solvent, printing may take place in a high humidity environment. In one example, a mist of the solvent may be continuously sprayed onto the nozzle during deposition. It is understood that the term "solvent" may be used in this disclosure to refer to both single-component and mixed solvents.

After depositing the continuous filament on the substrate, the continuous filament may be dried to remove the solvent. The drying may take place under ambient conditions or may involve heating at a moderate temperature which is effective to evaporate the solvent. The drying may occur over a long or short time duration (e.g., from less than 1 hour to a week or more).

After drying, a sintering step may be carried out to sinter the stabilizing particles into a sintered material that includes a population of pores created by the gas bubbles. This sintered material including the population of pores may be referred to as a sintered porous structure or foam. Sintering entails heating the continuous filament at an elevated temperature (such as about 1000-1500° C. or higher for inorganic materials and 200-400° C. for organic materials) to create necks or physical bonds between adjacent particles. The sintering may be carried out in air or in a controlled environment (e.g., an inert gas or vacuum). During sintering, some of the gas in the gas bubbles may diffuse away and some shrinkage of the sintered material surrounding the pores may occur.

In some cases, such as when a binder or non-gelled polymer precursor is incorporated into the foam ink composition, a prefiring step (or series of steps) may be carried out prior to sintering to pyrolyze any organics and achieve debinding or binder burnout. Suitable prefiring conditions may include a temperature in the range from about 100° C. to about 900° C., or more typically from about 200° C. to about 700° C., and a heating rate from about 0.1° C./min to about 20° C./min. Exemplary prefiring conditions that may be suitable for a foam ink composition are set forth in Table 1 below. The foam ink composition may include, for example, 1 w/w % binder (e.g., polyethylene glycol (PEG), 20K molecular weight (MW)) which is pyrolyzed during prefiring.

TABLE 1

| Exemplary Prefiring Conditions | |
| --- | --- |
| 1. | 1° C./min up to 200° C. |
| 2. | Hold at 200° C. for 20 hours |
| 3. | 1° C./min up to 300° C. |
| 4. | Hold at 300° C. for 20 hours |
| 5. | 1° C./min up to 500° C. |
| 6. | Hold at 500° C. for 20 hours |
| 7. | 1° C./min up to 700° C. |
| 8. | Hold at 700° C. for 20 hours |
| 9. | Cool at 2° C./min to room temperature |

If a metal foam is desired, a reducing or oxidizing step may follow deposition and drying of the continuous filament. In this case, the foam ink composition may include metal oxide or metal hydride particles that undergo reduction or oxidation to the parent metal. For example, CuO may be reduced to form copper, or $TiH_2$ may be oxidized to form titanium. Following the reduction or oxidation, the material may be sintered.

The population of pores in the sintered material may include closed pores having a substantially spherical morphology. In some cases, the sintered material may also include at least some open porosity (interconnected pores). To achieve this, fugitive particles comprising a polymer or carbon may be added to the foam ink composition. For example, latex particles or carbon black may serve as the fugitive particles. Prior to sintering, the continuous filament may be prefired as described above to effect burn-out (pyrolysis) of the fugitive particles, leading to the formation of an additional population of pores that form interconnections among the pores created by the gas bubbles.

As described above, the foam ink composition may further comprise, in addition to the particles, solvent and bubbles, a non-gelled polymer precursor or a binder for green body strength enhancement after printing.

Suitable non-gelled polymer precursors may include polyvinyl alcohol (PVA), polylysine, polyacrylamide or chitosan. The polymer precursor may include a crosslinker, such as a furan molecule or an aldehyde, specifically glutaraldehyde. The foam ink composition may further include an acid generator (e.g., a photoacid generator or thermal acid generator) to trigger the crosslinker to react with the polymer. The acid generator may be added to the foam ink composition in small proportion (e.g., about 1-3 wt. % relative to the polymer precursor) and be dispersed in solution rather than absorbed on the particles. The method may thus entail inducing gelation and/or crosslinking of the non-gelled polymer precursor to form a polymer reinforcement structure in the continuous filament. Gelation may be induced by methods known in the art, such as ultraviolet (UV) curing, thermal curing, or chemical curing. During curing, the acid generator generates acid, lowering the pH and triggering the crosslinking reaction. The crosslinking reaction may be triggered to occur immediately after extrusion from the nozzle and/or after deposition on the substrate, and prior to drying.

Suitable binders may include polyethylene glycol (PEG) and/or other polymers and/or macromolecules, such as sucrose. When the printed structure is dried and the solvent is removed from the foam ink composition, the binder can function as a glue to effectively bind together the remaining solid components (e.g., the stabilizing particles and any other particles or solids). Typically, the binder is employed at as low a concentration as possible since excessive amounts of the binder can lead to defects after sintering. For example, binder concentrations in the range from about 0.1 wt. % to about 10 wt. % relative to the total solids content of the foam ink composition, and in some cases from about 1 wt. % to about 5 wt. % relative to the total solids content, may be suitable. Table 2 provides exemplary PEG binder concentrations in both wt. % and vol. % relative to alumina stabilizing particles.

TABLE 2

Exemplary Binder Amounts

| wt. % PEG relative to alumina | vol. % PEG relative to alumina |
| --- | --- |
| 1 | 3.2 |
| 2 | 6.3 |
| 3 | 9.2 |
| 4 | 12.1 |
| 5 | 14.8 |
| 6 | 17.4 |
| 7 | 19.9 |
| 8 | 22.3 |
| 9 | 24.6 |
| 10 | 26.8 |

Because physical entanglements at the molecular level are largely if not entirely responsible for the binding effect, an increase in the molecular weight of the binder may allow the desired structural integrity to be achieved at a lower binder concentration, which may be advantageous for limiting defects. Conversely, a binder having a lower molecular weight (or a binder comprising a macromolecule such as sucrose) may be successfully employed at higher concentrations. Generally speaking, a polymer having a molecular weight in the range from 1,000 to 100,000 MW, and more typically from 1,000 to 20,000 MW, may be employed as a binder. At too high of a molecular weight, increased entanglements may detrimentally affect the viscosity of the ink composition (even at low binder concentrations), making the frothing and printing steps difficult or impossible.

The foam ink composition may also or alternatively include one or more types of nonabsorbing particles dispersed in the solvent. These particles may be designed to readily wet the solvent and thus they may be positioned away from the interfacial regions between the solvent and the gas bubbles. After the continuous filament is deposited and sintered, the nonabsorbing particles may be dispersed in the sintered material, forming a monolithic or composite sintered structure (depending on whether the nonabsorbing particles comprise the same or a different material from the stabilizing particles). The nonabsorbing particles may comprise a metal, ceramic, semiconductor or polymer with suitable surface properties for dispersion in the solvent.

The foam ink composition may include at least one additional population of particles that comprises a different material. For example, the stabilizing particles may comprise a first plurality of particles comprising a first material and a second plurality of particles comprising a second material, where the first and second materials are different. In one example, the first plurality of particles may comprise alumina, and the second plurality of particles may comprise another oxide, such as silica, or a carbide such as silicon carbide.

Although a single deposition nozzle is shown in FIG. 2, a plurality of deposition nozzles may be employed for 3D printing. For example, two or more, three or more, four or more, five or more and up to N nozzles may be used for extruding and depositing the continuous filaments, where $1 \leq N \leq 1024$; more typically, N is no more than 512, no more than 256, no more than 128, or no more than 64. The continuous filaments may be extruded from the N nozzles sequentially in a serial deposition process or simultaneously in a parallel deposition process, and each nozzle may contain the same or a different ink composition. It is also contemplated that the deposition may include both parallel and serial deposition steps. To facilitate sequential or serial printing, the nozzles can be independently controlled in the z-direction.

Each nozzle may have an inner diameter of from about 10 microns to about 1 mm in size, and more typically from about 50 microns to about 500 microns. The size of the nozzle may be selected depending on the desired continuous filament diameter. Depending on the injection pressure and the nozzle translation speed, the filament may have a diameter ranging from about 10 microns to about 10 mm, and more typically from about 100 microns (0.1 mm) to about 1 mm. The nozzle may be moved and the continuous filament may be deposited at print speeds as high as about 3 m/s (e.g., from about 1 cm/s to about 3 m/s), and are more typically in the range of from about 1 mm/s to about 500 mm/s, from about 0.1 mm/s to about 100 mm/s, or from about 0.5 mm/s to about 10 mm/s.

The ink(s) fed to the one or more nozzles may be housed in separate syringe barrels that may be individually connected to a nozzle for printing by way of a Luer-Lok™ or other connector. The extrusion of the ink composition may take place under an applied or injection pressure of from about 1 psi to about 1000 psi, from about 10 psi to about 500 psi, or from about 20 psi to about 100 psi. The pressure during extrusion may be constant or it may be varied. By using alternative pressure sources, pressures of higher than 100 psi and/or less than 1 psi, for example, may be applied during printing. A variable pressure may yield a continuous filament having a diameter that varies along the length of the filament. The extrusion is typically carried out at ambient or room temperature conditions (e.g., from about 18° C. to about 25° C.).

During the extrusion and deposition of each continuous filament, the nozzle may be moved with respect to the substrate along a predetermined 2D or 3D pathway (e.g., from $(x_1, y_1, z_1)$ to $(x_2, y_2, z_2)$) with a positional accuracy of within ±200 microns, within ±100 microns, within ±50 microns, within ±10 microns, or within ±1 micron. Accordingly, the continuous filament(s) may be deposited on the substrate with a positional accuracy of within ±200 microns, within ±100 microns, within ±50 microns, within ±10 microns, or within ±1 micron.

Also described herein is a 3D printed porous structure that comprises a continuous filament comprising the foam ink composition described above or elsewhere in this disclosure. The continuous filament may in some cases include a nonporous layer over some or all of the surface of the filament. The continuous filament may also or alternatively have a tubular structure comprising a hollow core.

A 3D printed hierarchical porous structure may comprise one or more continuous filaments arranged in a predetermined pattern on a substrate, where the one or more continuous filaments comprises a sintered material and includes a porosity of at least about 40 vol. %. In some cases, the porosity may be at least about 60 vol. %, at least about 80 vol. %, and as high as 95 vol. %. The sintered material (or foam) comprises a polymer, metal or alloy, ceramic, semiconductor, or any combination of these. The sintered material may be a monolithic porous solid or a composite porous solid. By 3D printing the foam ink composition described above, unprecedented levels of porosity may be achieved in the sintered material.

The porosity may comprise closed pores having a substantially spherical morphology. The closed pores may have an average diameter of from about 1 micron to about 50 microns, or from about 2 microns to about 20 microns. In some examples, the porosity may include a network of interconnected or open pores.

Figure 9A:
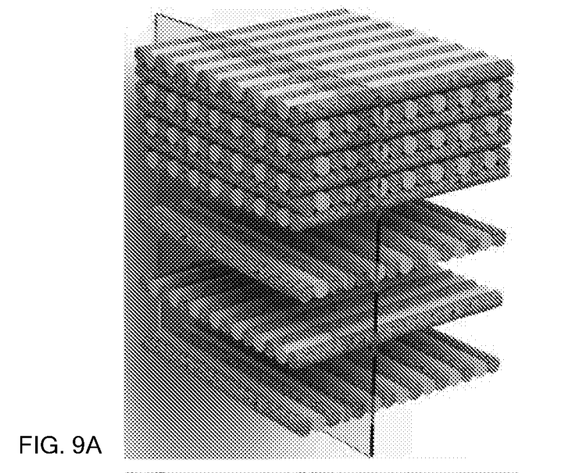
FIG. 9A shows a partially exploded schematic of a logpile structure including alternating foam and solid (substantially nonporous) continuous filaments in a brick and mortar arrangement. The plane through the logpile structure shows the viewing plane for FIGS. 9B and 9C.
Figure 9B:
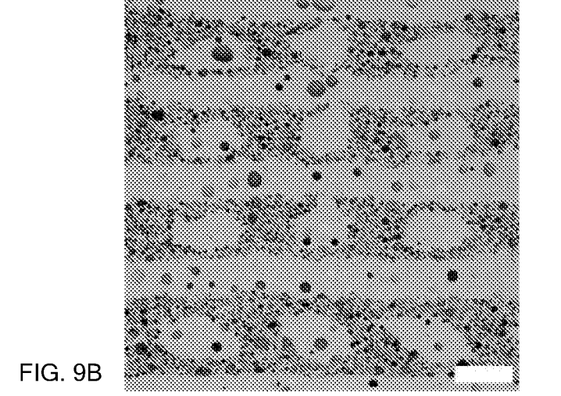
FIG. 9B is an image of interpenetrating foam and solid filaments in the logpile structure, where the scale bar represents 500 microns.
Figure 9C:
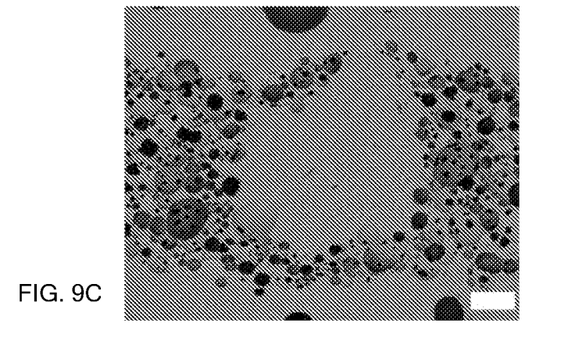
FIG. 9C is a zoomed-in image of one of the solid filaments and its interface with the surrounding foam filaments, where the scale bar is 100 microns.

The porosity of the one or more continuous filaments is a microscale porosity, whereas the 3D printed porous structure may further comprise a macroscale or printed porosity defined by the predetermined pattern in which the one or more continuous filaments are arranged. This printed porosity may include, for example, millimeter- to centimeter-scale pores. Referring to FIGS. 5A-5F, the predetermined pattern may be a lattice or grid structure, such as an orthogonal grid, or a cellular structure comprising cell walls separating empty cells, where the cell walls are formed by a stack of the one or more continuous filaments. The predetermined pattern may be a 2D or a 3D pattern that defines the architecture of the 3D printed structure, and may depend on the intended application. In some cases, the 3D printed hierarchical porous structure may further comprise one or more additional continuous filaments arranged in the predetermined pattern on the substrate, where the one or more additional continuous filaments comprise the same or a different sintered material and a different amount of porosity. In one example, the one or more additional continuous filaments may be substantially dense and have a porosity of no greater than about 15 vol. %, no greater than about 10 vol. %, or no greater than about 5 vol. %. In other words, the additional continuous filament(s) may be solid or substantially nonporous, which may provide structural advantages when combined with foam continuous filaments. An example is shown in FIGS. 9A-9C. The 3D printed hierarchical porous structures described above may be used as catalyst supports, electrodes for batteries or fuel cells, lightweight foams, filtration media, and/or separation media.

EXAMPLE

An alumina-based foam ink composition is prepared and printed as summarized in Table 3 below. After drying and sintering, porous structures (or foams) comprising sintered alumina and including over 80 vol. % porosity are formed.

TABLE 3

Exemplary Foam Ink Composition and Processing/Printing Conditions

| | |
|---|---|
| Stabilizing Particle | Alumina (35 vol. %) |
| Solvent | Water |
| Surface Modifier | Butyric acid (4.8 μmol/m² of alumina surface area) |
| Drying Retarder | Rice Starch (3 wt. % relative to water) |
| Binder | Polyethylene glycol (20,000 g/mol, 1 wt. % relative to alumina) |
| Frothing conditions | 2 min at 400, 500, 700, 900 rpm with 4 bladed impeller<br>5 min at 1000, 1200, 1500 rpm with 4 bladed impeller<br>1-2 min at 1200 rpm with flat bottomed kitchen whisk |
| pH during Frothing | 5 |
| Print Conditions | 610 micron (ID) tapered nozzle with an ink flow rate of 1 mL/min and translation speed 24-52 mm/s |

TABLE 3-continued

Exemplary Foam Ink Composition and Processing/Printing Conditions

| | |
|---|---|
| Drying | 7-10 days in a sealed container at 50% humidity and ambient 70° F. Followed by 2 hours at 70° C., 4 hours at 90° C., and 24 hours at 110° C. |
| Debinding | 20 hours at 200° C., 20 hours at 300° C., 20 hours at 500° C., 20 hours at 700° C. |
| Sintering | 1° C./min up to 1500° C., 1500° C. for three hours, cool to room temperature at 2° C./min |

Figure 3A:
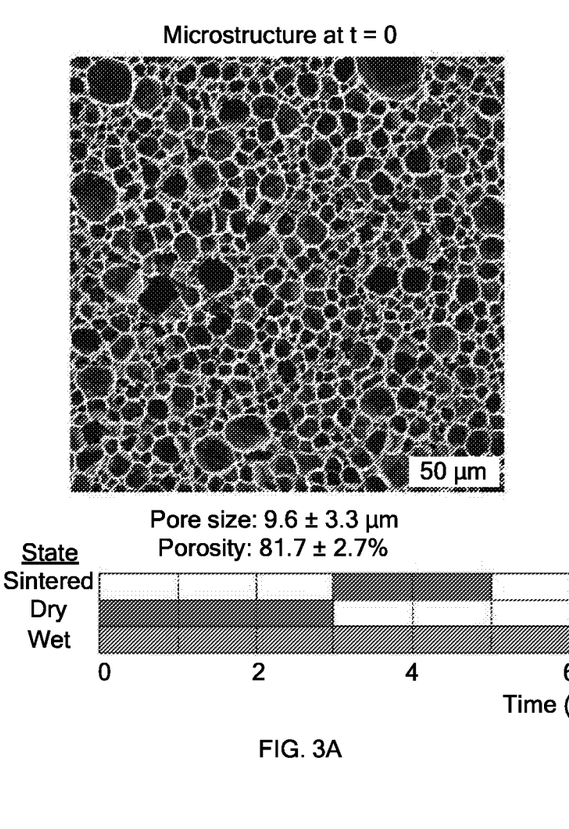
FIGS. 3A-3B show the time stability of the microstructure of a 3D printed, sintered porous structure with over 80 vol. % porosity at a time t=0 and at a time t=7 days via scanning electron microscope (SEM) images.
Figure 3B:
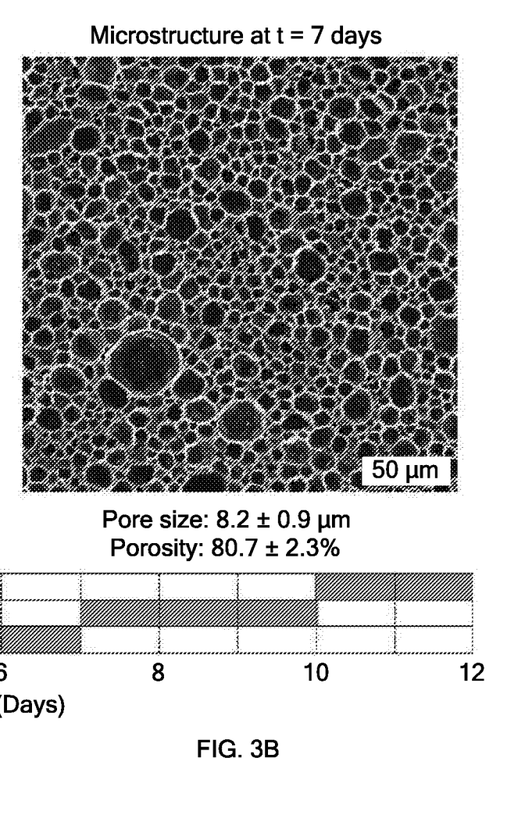

FIGS. 3A-3B show the time stability of the microstructure of printed alumina structures with over 80 vol. % porosity at a time t=0 and at a time t=7 days via scanning electron microscope (SEM) images, where the time t indicates how long the foam ink composition is allowed to remain wet prior to solvent removal. The chart under the figures provides a timeline of the processing sequence for each of the pictured structures. The dark gray boxes in the chart correspond to the t=0 days microstructure, while the light gray boxes correspond to the t=7 days microstructure.

To prevent drying, the printed alumina structures are placed in a sealed glass jar. By remaining wet, the foam ink composition is free to collapse, coarsen, and/or destabilize if it is energetically favorable to do so. The similar microstructures with and without aging under wet conditions show that the foam ink composition is indeed stable. After the appointed time (0 and 7 days, respectively) the printed alumina structures are removed from the jar such that the solvent can be removed. No aging is expected to occur once drying begins since the particles have no medium through which to move once the solvent begins to leave. This corresponds to the drying time. After the initial wet stage, both printed alumina structures are processed identically. Each is dried for three days, and then sintered over the course of two days. The progress of each processing step is tracked by the shaded boxes in the chart.

Figure 4A:
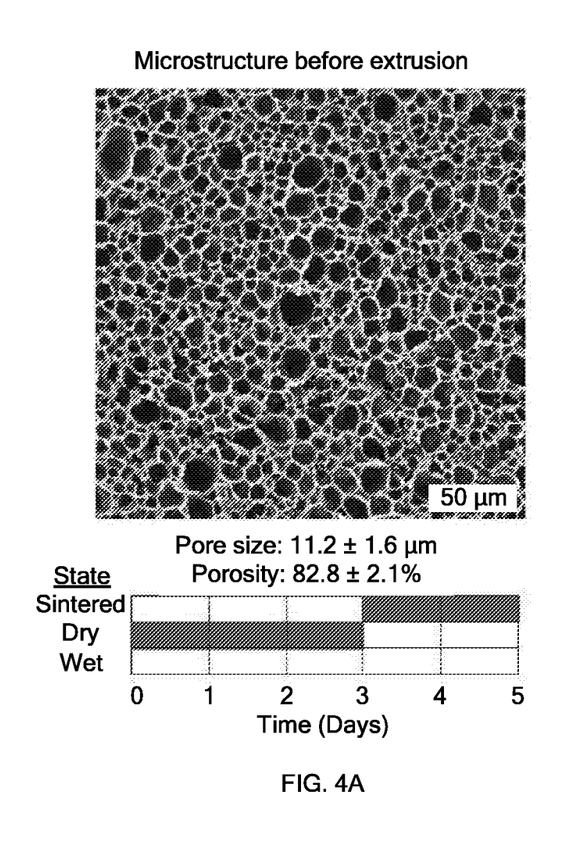
FIGS. 4A-4B show the stability of an exemplary foam ink composition before and after extrusion, respectively, via SEM images.
Figure 4B:
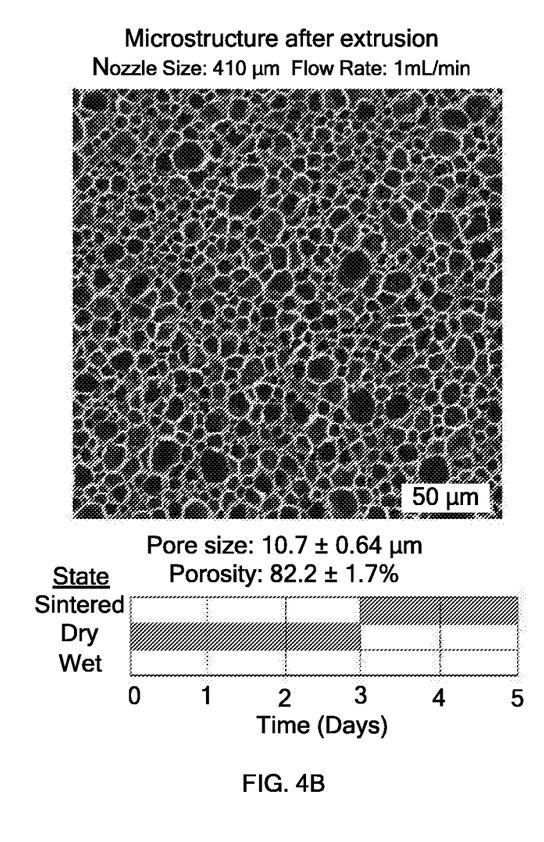

FIGS. 4A-4B show the stability of the exemplary foam ink composition before and after extrusion, respectively, via SEM images. The chart below each figure shows that both foam ink compositions are dried immediately after printing and are processed identically through imaging.

Figure 5E:
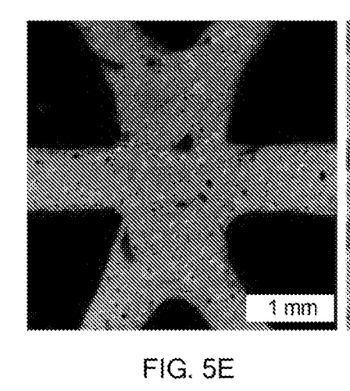
FIG. 5E is a close-up view (scale bar represents 1 mm) of a node of the cellular structure of FIG. 5D.
Figure 5F:
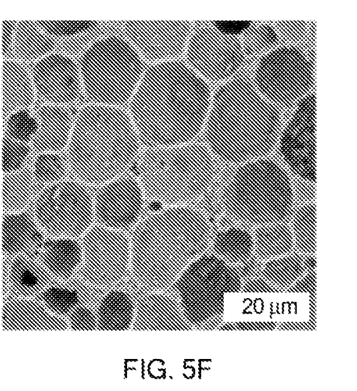
FIG. 5F shows the microscale porosity (scale bar represents 20 microns) inherent to the cellular structure of FIGS. 5D and 5E.

FIGS. 5A-5F show 3D printed continuous filaments with over 80 vol. % porosity arranged in various 3D patterns, including grid or logpile structures (FIGS. 5A and 5B) and cellular structures including hexagonal (FIG. 5C) and triangular (FIG. 5D) unit cells. The printed structures are prepared from foam ink compositions as set forth in Table 3. FIG. 5E shows a close-up view of one of the nodes from the printed structure of FIG. 5D, while FIG. 5F shows a close-up view of a portion of the node shown in FIG. 5E. Taken together, the images illustrate the concept of a hierarchically porous 3D printed ceramic.

Figure 6A:
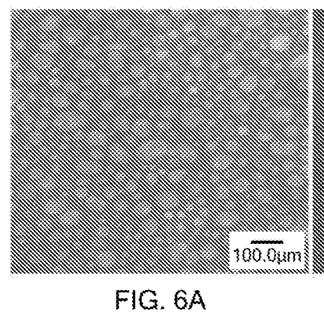
FIGS. 6A-6C show images of foam ink compositions prepared with different surfactant concentrations (2.4, 4.8 and 7.2 µmol/m$^2$, respectively), where pore size can be seen to decrease with surfactant concentration. The images illustrate the impact of the surfactant concentration on both the pore size (gas bubble size) and the amount of porosity.
Figure 6B:
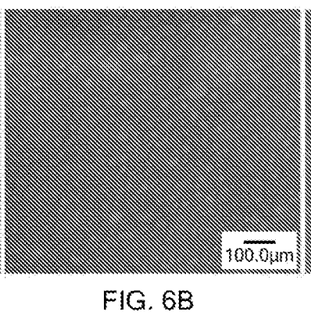
Figure 6C:
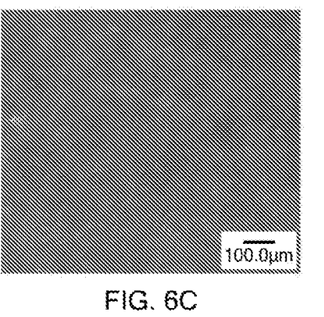

FIGS. 6A-6C show images of foam ink compositions prepared with different surfactant concentrations (2.4, 4.8 and 7.2 μmol/m², respectively). The figures show the impact of the surfactant concentration on pore size (gas bubble size) and amount of porosity, where a higher surfactant concentration is associated with a higher fraction of porosity and a smaller average pore size. The porosity of the foam ink composition shown in FIG. 6A is about 58% with a pore size of 28±3 microns; the porosity of the foam ink composition shown in FIG. 6B is about 66%±3% with a pore size of 12±1 microns; and the porosity of the foam ink composition shown in FIG. 6C is about 83%±2% with a pore size of 8±0.8 microns. The foam ink compositions may be prepared as described above in Table 3, with the exception of the different surfactant concentrations.

Figure 6D:
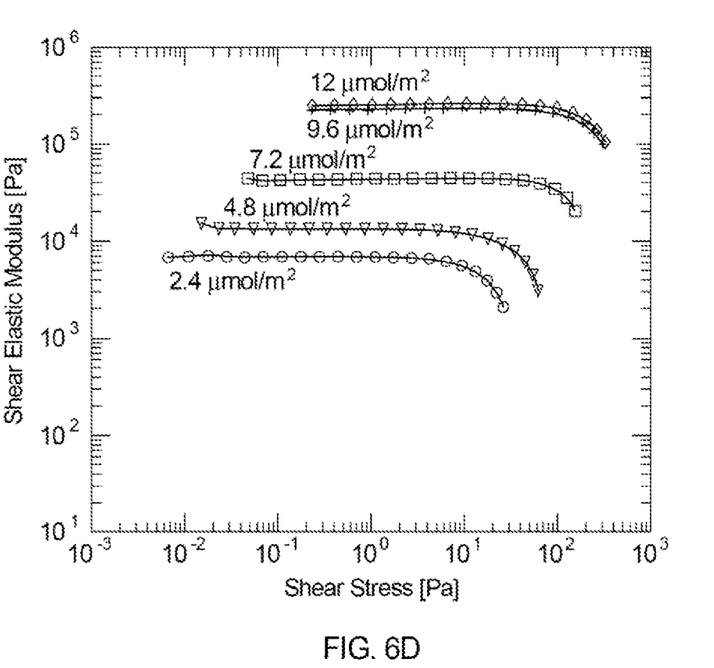
FIG. 6D provides a graph illustrating the viscoelastic behavior of the foam ink compositions shown in FIGS. 6A-6C, as well as data for additional foam ink compositions including higher surfactant concentrations (9.6 µmol/m$^2$ and 12 µmol/m$^2$) but having otherwise identical compositions.

FIG. 6D shows a graph illustrating the viscoelastic behavior of the foam ink compositions shown in FIGS. 6A-6C, as well as data for additional foam ink compositions including higher surfactant concentrations (9.6 µmol/m$^2$ and 12 µmol/m$^2$) but having otherwise identical compositions. Specifically, FIG. 6D shows the change in shear elastic modulus and yield stress as a function of surfactant concentration for five foam ink compositions. As surfactant concentration increases, particle hydrophobicity and attraction increase, leading to increased stiffness and yield stress. At excessively high values of stiffness, mixing of the ink compositions to incorporate air and/or 3D printing may become prohibitively difficult.

Figure 6E:
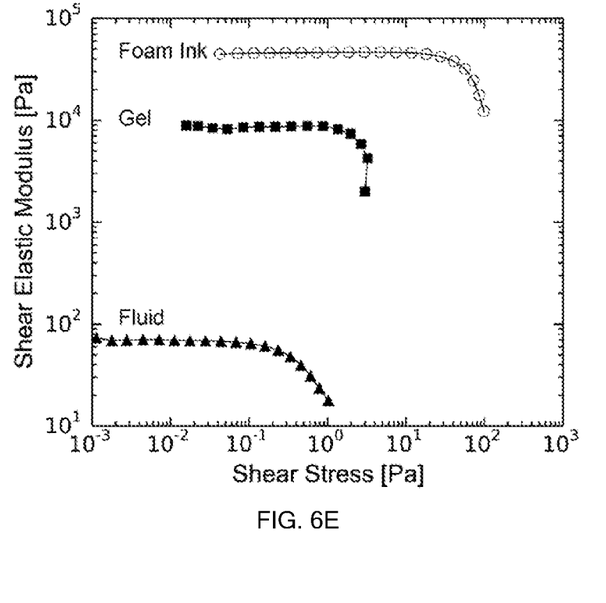
FIG. 6E shows data from oscillatory tests of an exemplary foam ink composition at various periods during the synthesis process: the curve labeled "Fluid" corresponds to a fully formulated ink composition prior to air introduction (no bubbles) and for which the pH is left unadjusted at about 3; the curve labeled "Gel" corresponds to the same ink composition after the pH has been raised to 5; and the curve labeled "Foam Ink" corresponds to the same ink composition after air introduction, such that it is ready-to-print with a pH=5 and air bubbles.

FIG. 6E shows data from oscillatory tests of an exemplary foam ink composition at various periods during the synthesis process. The curve labeled "Fluid" corresponds to a fully formulated ink composition prior to air introduction (no bubbles) and for which the pH is left unadjusted at about 3; the curve labeled "Gel" corresponds to the same ink composition after the pH has been raised to 5; and the curve labeled "Foam Ink" corresponds to the same ink composition after air introduction, such that it is ready-to-print with a pH=5 and air bubbles. The plot reveals how gelation and foaming affect the shear elastic modulus and yield stress of the ink composition. The shear elastic modulus corresponds to the plateau region in the curves, while the yield stress can be approximated based on where the curves begin to depart from the plateau region. Increasing the pH may decrease electrostatic repulsion between the particles and increase the degree of surfactant ionization, both of which can lead to stronger interparticle attraction and a stiffer material response. Adding air may increase the stiffness increase due to an additional elastic network that can be attributed to entrapped bubbles.

Figure 6F:
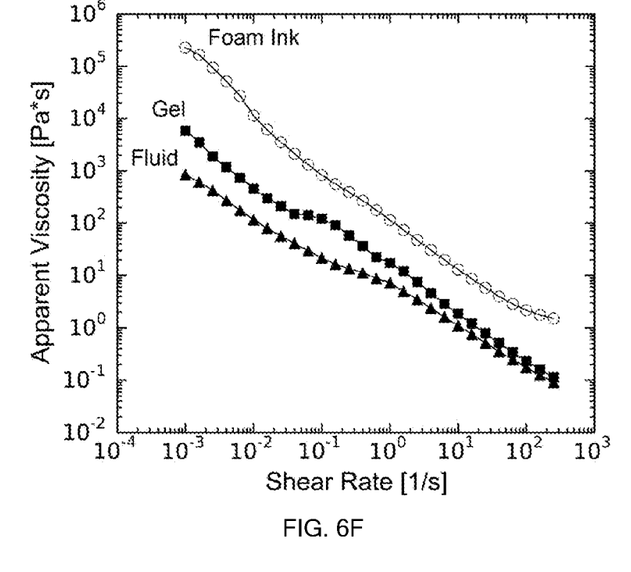
FIG. 6F shows flow test data for the fluid, gel and foam ink compositions of FIG. 6E. The degree of shear thinning is indicated by the slope of the lines.

FIG. 6F shows flow test data for the fluid, gel and foam ink compositions of FIG. 6E. The degree of shear thinning (as indicated by the slope of the lines) remains substantially the same throughout processing of the ink composition; however, the apparent viscosity at each measured shear rate increases depending on the level of processing. As more and more attraction develops in the system, more force is required to initiate flow.

Figure 7A:
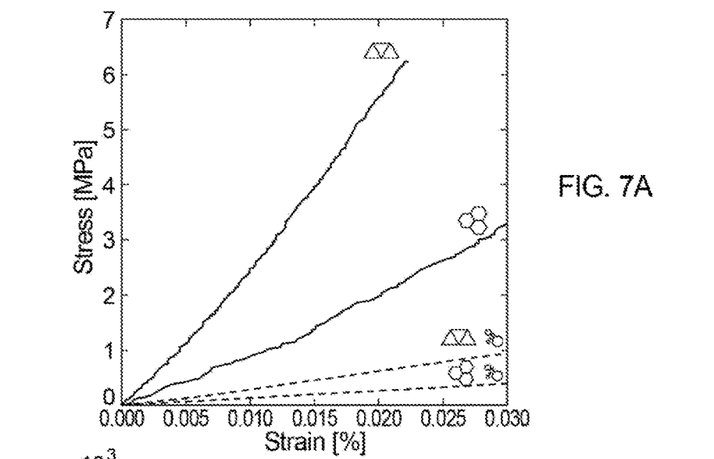
FIGS. 7A and 7B show stress-strain and elastic modulus data for specimens of different architectures and microstructures, as indicated in the legend below FIG. 7B.
Figure 7B:
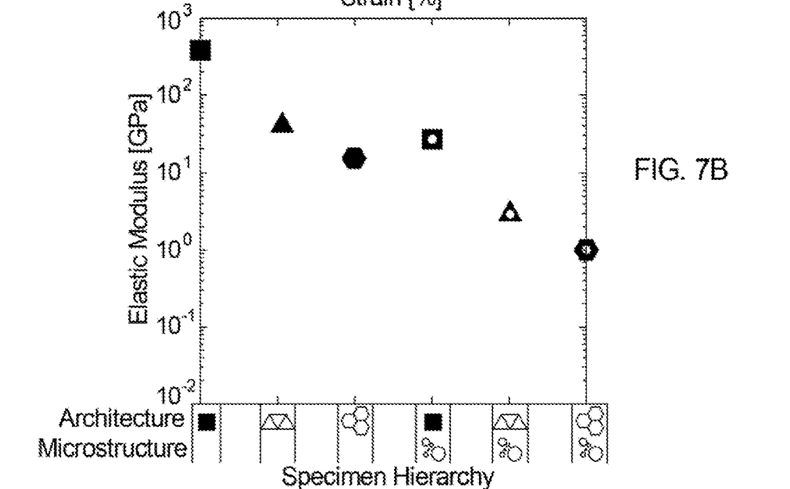
Figure 7C:
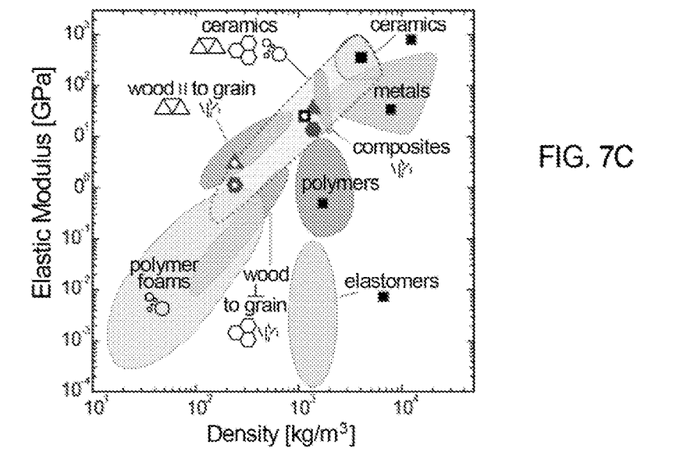
FIG. 7C shows experimentally determined elastic modulus versus density space coverage as a function of material hierarchy for the foam ink compositions developed in this work.

FIGS. 7A and 7B show stress-strain and elastic modulus data for specimens of different architectures (solid and cellular structures) and microstructures (nonporous and foam), as indicated in the legend below FIG. 7B. The black squares indicate solid samples, in terms of architecture, and the triangles and hexagons represent data from the corresponding cellular structures, which include printed porosity. The nonporous specimens (in terms of microstructure) are indicated with solid data points, while the foam specimens are represented by hollow data points. FIG. 7C shows show experimentally-determined elastic modulus versus density space coverage as a function of material hierarchy for the foam ink compositions developed in this work.

Figure 8A:
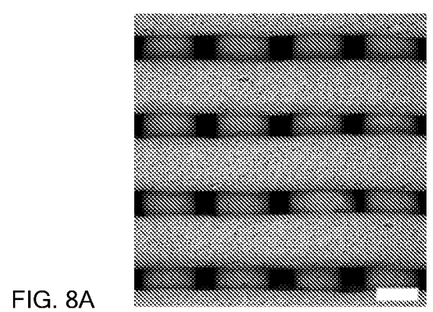
FIGS. 8A-8F show different views of a number of continuous filaments arranged in a logpile or grid pattern, where the scale bars in FIGS. 8A-8C represent 1000 microns (or 1 mm), and the scale bars in FIGS. 8D-8F represent 500 microns. The continuous filaments shown have a tubular structure with a hollow core.
Figure 8B:
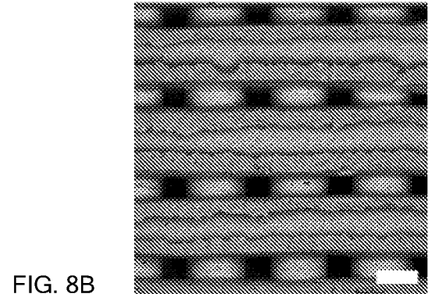
Figure 8C:
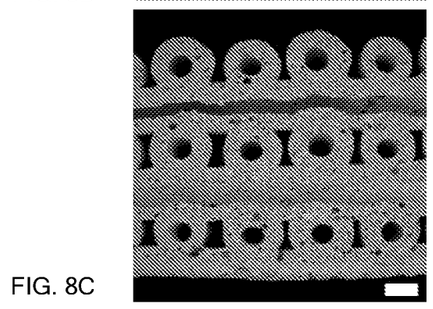
Figure 8D:
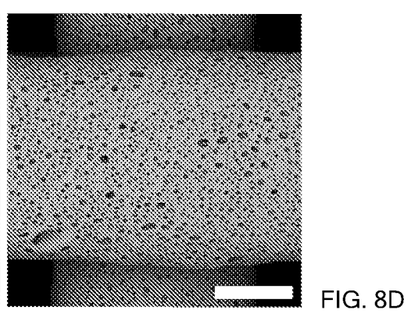
Figure 8E:
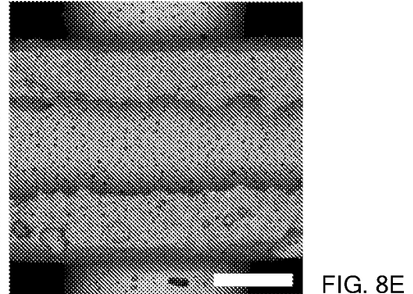
Figure 8F:
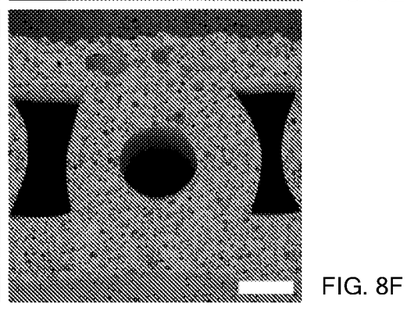

FIGS. 8A-8F show different views of a 3D printed hierarchical porous structure including a number of continuous filaments comprising a sintered alumina foam and arranged in a logpile or grid pattern. The 3D printed structure has been processed as set forth in Table 3. The scale bars in FIGS. 8A-8C represent 1000 microns (or 1 mm), and the scale bars in FIGS. 8D-8F represent 500 microns. The continuous filaments have a tubular structure with a hollow core, as can be seen clearly in the cross-sectional views of FIGS. 8C and 8F, where a side portion of the logpile structure has been removed by polishing. FIG. 8A shows a top view of the logpile structure, and FIG. 8B shows a similar view except the top half of the uppermost layer of filaments has been polished off to expose the hollow interior, or core, of the continuous filaments. The zoomed-in images of FIGS. 8D-8F show that at the surfaces of shear (e.g., surfaces in contact with an extrusion surface of the deposition nozzle during printing), the microstructure may differ from bulk portions of the filament. At such surfaces, there may be much less porosity and the pores may be isolated from each other. In the bulk portions, the porosity may be significantly higher, and the pores may be largely or completely surrounded by other pores.

FIG. 9A shows a partially exploded schematic of 3D printed foam and solid continuous filaments arranged in an alternating logpile or "brick and mortar" pattern. The plane through the 3D printed structure shows the viewing plane for FIGS. 9B and 9C. The foam filaments are 3D printed and sintered from a foam ink composition as described above, and the solid (substantially nonporous) filaments are 3D printed and sintered from an alumina-particle based ink formulation that does not undergo the air incorporation step. FIG. 9B is cross-sectional image of interpenetrating foam and solid filaments in the logpile structure, where the scale bar represents 500 microns. FIG. 9C is a zoomed-in image of one of the solid filaments and its interface with the surrounding foam filaments, where the scale bar is 100 microns. This image demonstrates that solid and foam continuous filaments can be integrated into a sintered, 3D-printed structure without any discernible interfaces.

The entire disclosures of International Patent Application PCT/US2014/043860, filed on Jun. 24, 2014, and International Patent Application PCT/US2015/15149, filed on Feb. 10, 2015, are hereby incorporated by reference in their entirety.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of printing a porous structure, the method comprising:
   extruding a foam ink composition through a nozzle, the foam ink composition comprising stabilizing particles and gas bubbles dispersed in a solvent, the stabilizing particles comprising a predetermined interfacial energy so as to exhibit a contact angle with the solvent of from about 15° to about 90°, and at least a portion of the stabilizing particles being positioned at interfacial regions between the solvent and the gas bubbles, thereby stabilizing the gas bubbles in the foam ink composition; and
   depositing a continuous filament comprising the foam ink composition on a substrate,
   wherein the depositing occurs in a controlled environment saturated with a vapor of the solvent.

2. The method of claim 1, further comprising heating the continuous filament at an elevated temperature to sinter the stabilizing particles into a sintered material surrounding a population of pores created by the gas bubbles.

3. The method of claim 2, wherein the foam ink composition further comprises fugitive particles comprising a polymer and/or carbon, and wherein heating the continuous filament at the elevated temperature further comprises forming an additional population of pores defined by the fugitive particles.

4. The method of claim 1, wherein the foam ink composition further comprises a non-gelled polymer precursor, and further comprising, after extrusion and/or deposition of the continuous filament on the substrate, inducing gelation and/or crosslinking to form a polymer reinforcement structure in the continuous filament.

5. A 3D printed porous structure comprising:
a continuous filament comprising a foam ink composition comprising stabilizing particles and gas bubbles dispersed in a solvent, the stabilizing particles comprising a predetermined interfacial energy so as to exhibit a contact angle with the solvent of from about 15° to about 90°, and at least a portion of the stabilizing particles being positioned at interfacial regions between the solvent and the gas bubbles, thereby stabilizing the gas bubbles in the foam ink composition,
wherein the continuous filament has a tubular structure comprising a hollow core.

6. The 3D printed porous structure of claim 5, further comprising a nonporous surface layer on the continuous filament.

7. A method of printing a porous structure, the method comprising:
extruding a foam ink composition through a nozzle and depositing a continuous filament comprising the foam ink composition on a substrate, the foam ink composition comprising stabilizing particles and gas bubbles dispersed in a solvent, the stabilizing particles comprising a predetermined interfacial energy so as to exhibit a contact angle with the solvent of from about 15° to about 90°, and at least a portion of the stabilizing particles being positioned at interfacial regions between the solvent and the gas bubbles, thereby stabilizing the gas bubbles in the foam ink composition; and
heating the continuous filament at an elevated temperature to sinter the stabilizing particles into a sintered material surrounding a population of pores created by the gas bubbles,
wherein the foam ink composition further comprises fugitive particles comprising a polymer and/or carbon, and wherein the heating further comprises forming an additional population of pores defined by the fugitive particles.

* * * * *